A. FRICKER.
DISCHARGE MECHANISM FOR BITUMINOUS DISTRIBUTERS.
APPLICATION FILED OCT. 29, 1917.
1,325,513.
Patented Dec. 23, 1919.
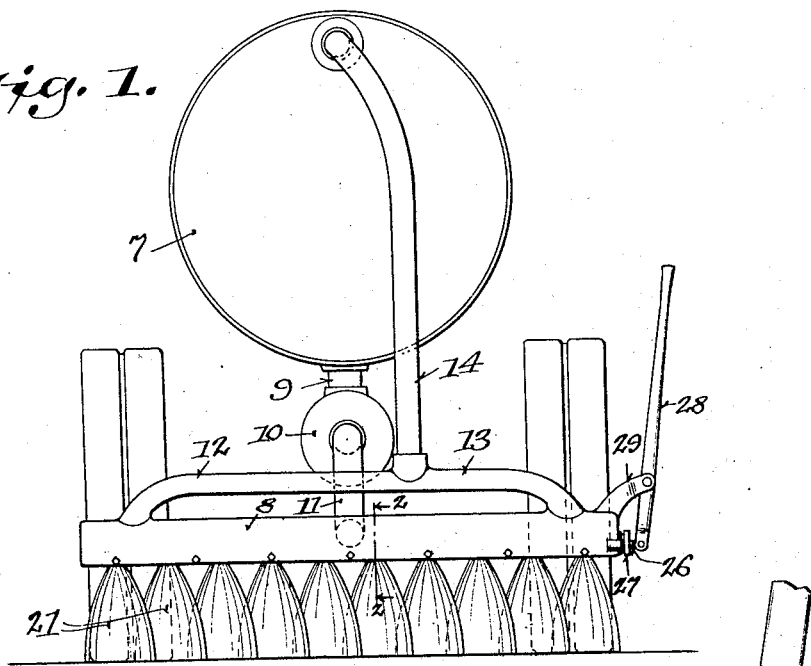
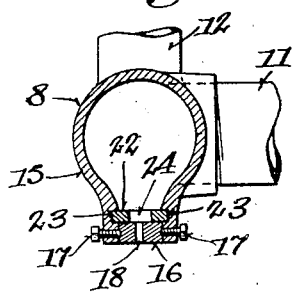
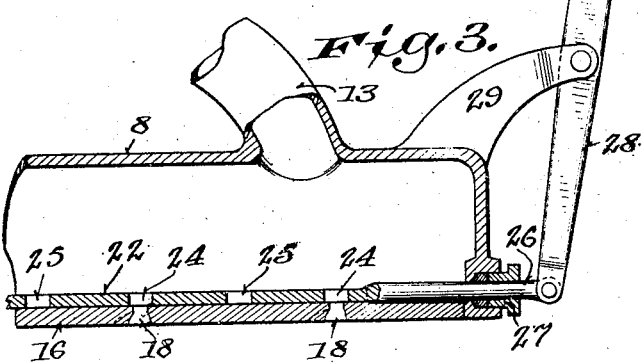
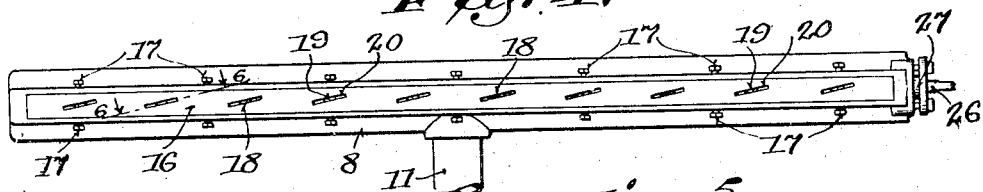
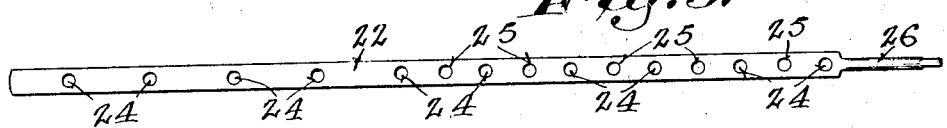
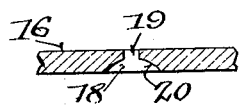

UNITED STATES PATENT OFFICE.

ANTHONY FRICKER, OF CLEVELAND, OHIO.

DISCHARGE MECHANISM FOR BITUMINOUS DISTRIBUTERS.

1,325,513.  Specification of Letters Patent.  Patented Dec. 23, 1919.

Application filed October 29, 1917. Serial No. 199,080.

*To all whom it may concern:*

Be it known that I, ANTHONY FRICKER, a citizen of the United States, and resident of Cleveland, in the county of Cuyahoga and State of Ohio, have invented new and useful Improvements in Discharge Mechanism for Bituminous Distributers, of which the following is a description, reference being had to the accompanying drawings, which are a part of this specification.

The invention relates to discharge mechanism for distributers of bituminous material and petroleum products for road making.

The materials distributed by the machine have a natural tendency to solidify and congeal under ordinary temperatures so that for successful operation it is necessary to keep the discharge valves and orifices heated to prevent clogging to obviate first heating the valves by means of a blow torch to loosen up the congealed material. To provide for this I have designed a discharge mechanism in which the discharge orifices are formed in the manifold with the valves disposed within the manifold through which the hot material is continuously circulated in an efficient manner.

The invention is further designed to provide a discharge mechanism in which the streams of material from the manifold overlap each other so as to thoroughly cover the surface to be treated.

The invention further consists in the several features hereinafter set forth.

In the drawings:

Figure 1 is a rear view of the distributer showing it equipped with the device embodying the invention;

Fig. 2 is a section taken on the line 2—2 of Fig. 1;

Fig. 3 is a detail vertical sectional view of one end of the manifold;

Fig. 4 is a bottom view of the manifold;

Fig. 5 is a view of the slide valve; and

Fig. 6 is a section taken on the line 6—6 of Fig. 5.

In general the device comprises a supply tank 7 for the heated material, a discharge manifold 8, means for circulating the heated material through the manifold, and means for discharging the material from the manifold.

The tank 7 is mounted upon an automobile or other vehicle and the material is delivered from the tank to a pipe 9 and thence by a pump 10 and pipe 11, communicating with the central portion of the manifold, to the manifold under pressure. A duplex by-pass consists of pipes 12 and 13 respectively communicating with the ends of the manifold and leading to a return pipe 14 which communicates with the tank 7. With this construction the heated material from the tank is delivered under pressure to the intermediate portion of the manifold passes therethrough to the ends and returns through the pipes 12, 13 and 14 to the tank thus continuously circulating the material through the manifold and heating it.

The manifold 8 consists of a closed pipe having tapering sides 15 whereby the material will naturally tend to flow toward the bottom of the manifold, a plate 16 being secured in any suitable manner as by screw bolts 17 to form the bottom of the manifold.

The means for discharging the material from the manifold consists of a plurality of spaced apart nozzles or orifices 18 in the plate 16, and valve mechanism for controlling the passage of material from the manifold through said orifices.

Each of the orifices is formed by an aperture 19 adjacent the inner side of the plate 16 and a flared or arc-shaped slot 20 adjacent the bottom of the plate 16, the aperture 19 communicating with the central portion of the slot. An orifice of this kind will deliver the material from the manifold in a flat fan-shaped spray as shown at 21 in Fig. 1. In order that the road may be thoroughly covered but without interfering with the individual action of each of the sprays, the orifices are staggered with respect to each other that is they are parallel to but out of line with each other so that the material is delivered from the manifold in overlapping fan-shaped sprays as shown in Fig. 1.

The valve mechanism consists of a slide valve plate 22 slidably mounted in longitudinally extending guideways 23 in the manifold 8 and provided with sets of apertures 24 and another set of apertures 25, and means for operating said valve plate. The set of apertures 24 run the whole length of the plate 22 while the set of apertures 25 only run for a portion of the length of said plate so that when the plate 22 is moved to bring the apertures 24 into line with the orifices 18 a greater spread of material is obtained than when the apertures 25 are brought into register with the orifices 18.

One end 26 of the valve plate is formed in the shape of a rod which moves in the stuffing box 27 and to which the lower end of a shifting lever 28 is pivotally secured, said lever being pivotally secured intermediate its ends to a bracket 29 projecting from the end of the manifold 8. By this means the valve plate 22 is moved by the lever 28 to bring the apertures 24 into register with the orifices 18 or if it is desired to spread only a portion of the road, the plate is moved by the lever 28 to bring the apertures 25 into register with the orifices 18.

With this construction it will be noted that the discharge orifices are formed in manifold, that the valves for the orifices are disposed within the manifold so that the heating of the manifold by the continuous circulation of the heated material will prevent clogging of the discharge mechanism.

It will be further noted that the discharge mechanism is of very simple construction and that the discharge orifices are designed for maximum spreading efficiency.

I am aware that the details of construction herein shown and described are subject to some modification and change and I therefore desire it to be understood that such changes in construction as come within the scope of the appended claims I deem to be within the spirit of my invention.

What I claim as my invention is:

1. In a bituminous distributer, a discharge manifold formed with an open bottom-side and longitudinally extending guide-ways in its side-walls, a plate secured in the open bottom-side to form a bottom for the manifold, said plate having a series of discharge nozzles, and a valve-plate mounted to slide longitudinally in said guide-ways and provided with a series of apertures adapted to register with all of said discharge nozzles, and also another series of apertures in the valve-plate adapted to register with some of the nozzles only.

2. In a bituminous distributer, a discharge manifold having a series of discharge nozzles, a valve plate mounted to slide longitudinally in the manifold, said valve-plate being provided with a series of apertures which register with all of said discharge nozzles when the valve-plate is moved in one direction, and also another series of apertures which register with some of said nozzles only when the valve-plate is moved in the other direction.

3. In a bituminous distributer, a discharge manifold having a series of discharge nozzles, a valve-plate mounted to slide longitudinally in the manifold, said valve-plate being provided with a series of apertures along the full length of the plate and which register with all of the discharge nozzles; and also another series of apertures in one end only of the valve-plate which will register with only some of the nozzles in the manifold.

In testimony whereof, I affix my signature.

ANTHONY FRICKER.